(12) United States Patent
Ishimatsu

(10) Patent No.: US 10,277,828 B2
(45) Date of Patent: Apr. 30, 2019

(54) IMAGE PICKUP APPARATUS, CONTROL APPARATUS, CONTROL METHOD, AND STORAGE MEDIUM

(71) Applicant: CANON KABUSHIKI KAISHA, Tokyo (JP)

(72) Inventor: Rie Ishimatsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/483,055

(22) Filed: Apr. 10, 2017

(65) Prior Publication Data

US 2017/0295308 A1 Oct. 12, 2017

(30) Foreign Application Priority Data

Apr. 12, 2016 (JP) .................. 2016-079612

(51) Int. Cl.
*H04N 5/235* (2006.01)
*H04N 5/238* (2006.01)
*G02F 1/139* (2006.01)

(52) U.S. Cl.
CPC ........... *H04N 5/238* (2013.01); *G02F 1/1393* (2013.01)

(58) Field of Classification Search
CPC ............................. H04N 5/238; G02F 1/1393
See application file for complete search history.

(56) References Cited

U.S. PATENT DOCUMENTS

| 9,064,763 B2 | 6/2015 | Ozawa et al. |
| 2009/0079982 A1 | 3/2009 | Lefaudeux |
| 2016/0123811 A1* | 5/2016 | Hegyi .................. G01J 3/0256 348/33 |
| 2016/0165107 A1 | 6/2016 | Oguchi |

FOREIGN PATENT DOCUMENTS

| JP | 2010124011 A | 6/2010 |
| JP | 5682437 B2 | 3/2015 |
| JP | 2015046744 A | 3/2015 |

* cited by examiner

*Primary Examiner* — Padma Haliyur
(74) *Attorney, Agent, or Firm* — Rossi, Kimms & McDowell LLP

(57) ABSTRACT

An image pickup apparatus is configured to obtain polarization information based on a plurality of images having different polarization states obtained by changing a retardation provided to light from an object. The image pickup apparatus includes an image pickup element configured to obtain the plurality of images, and a controller configured to change the retardation and to set an image pickup condition of the image pickup apparatus. The controller sets the image pickup condition while the retardation is changed to a reference value that is from −90 degrees to +90 degrees inclusive.

19 Claims, 12 Drawing Sheets

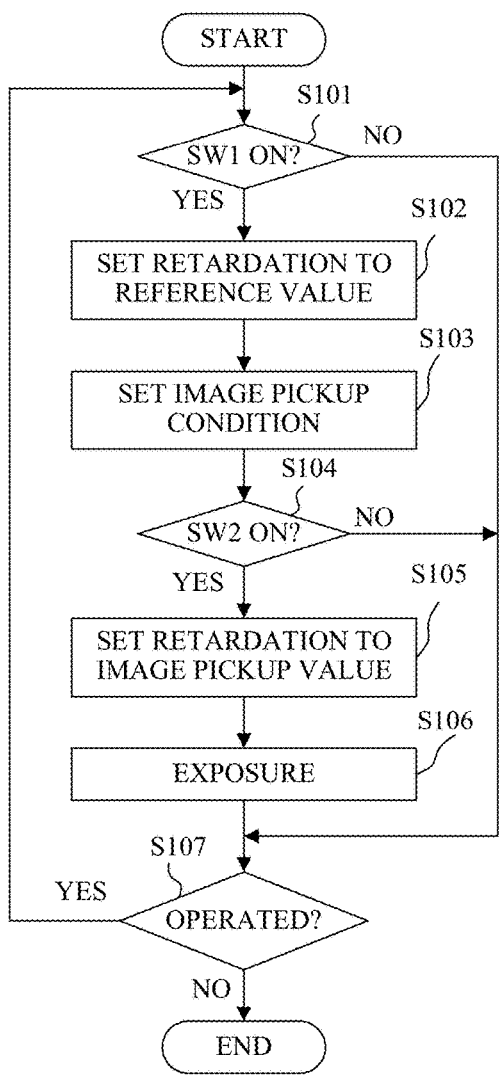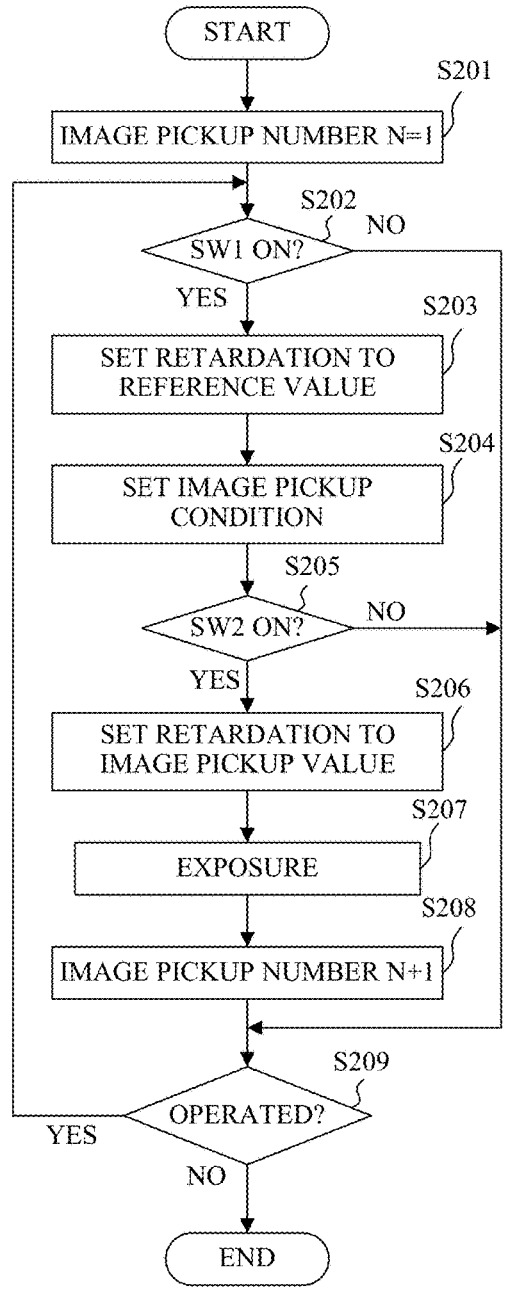
FIG. 6
FIG. 7

US 10,277,828 B2

IMAGE PICKUP APPARATUS, CONTROL APPARATUS, CONTROL METHOD, AND STORAGE MEDIUM

BACKGROUND OF THE INVENTION

Field of the Invention

The present invention relates to an image pickup apparatus, a control apparatus, a control method, and a storage medium.

Description of the Related Art

One conventional image pickup apparatus can emphasize and detect a predetermined characteristic of an object by observing a polarization state of light from the object. For example, when images are captured with a single-lens reflex camera in which a polarization filter is attached to its front surface of the lens, a texture can be highlighted, such as a color and contrast of an object, and an image of reflected light of a water surface etc. can be highlighted or suppressed. In addition, one conventional inspection apparatus etc. can detect an edge and a defect of an object by capturing images of the object in different polarization directions.

Japanese Patent No. 5,682,437 discloses a configuration of an image pickup element that includes a wire grid polarizer that transmits different polarized light for each pixel on a solid-state image pickup element and extracts polarization information from a plurality of pixels. U.S. Patent Application Publication No. 2009/0079982 discloses a configuration that includes a quarter waveplate, two retardation plates having a variable retardation, and a polarizer, and obtains part of a Stokes parameter by changing an axial direction of each retardation plate and by capturing a plurality of images.

However, Japanese Patent No. 5,682,437 requires a plurality of pixels to obtain the polarization information, and the resolution and the color information are lost. U.S. Patent Application Publication No. 2009/0079982 expensively needs two variable retardation plates and a complicated control. Moreover, the configurations disclosed in Japanese Patent No. 5,682,437 and U.S. Patent Application Publication No. 2009/0079982 cannot correctly obtain the polarization information of the object when the optical low-pass filter and autofocusing unit are disposed in front of the image pickup element and depend on the polarization in a general digital single-lens reflex camera etc.

SUMMARY OF THE INVENTION

The present invention provides an image pickup apparatus, a control apparatus, a control method, and a storage medium, which can obtain good polarization information with a simple structure.

An image pickup apparatus according to one aspect of the present invention is configured to obtain polarization information based on a plurality of images having different polarization states obtained by changing a retardation provided to light from an object. The image pickup apparatus includes an image pickup element configured to obtain the plurality of images, and a controller configured to change the retardation and to set an image pickup condition of the image pickup apparatus. The controller sets the image pickup condition while the retardation is changed to a reference value that is from −90 degrees to +90 degrees inclusive.

Further features of the present invention will become apparent from the following description of exemplary embodiments with reference to the attached drawings.

BRIEF DESCRIPTION OF THE DRAWINGS

FIG. 6 is a flowchart of a control method according to a first embodiment.

FIG. 7 is a flowchart of the control method according to the first embodiment.

DESCRIPTION OF THE EMBODIMENTS

Figure 1A:
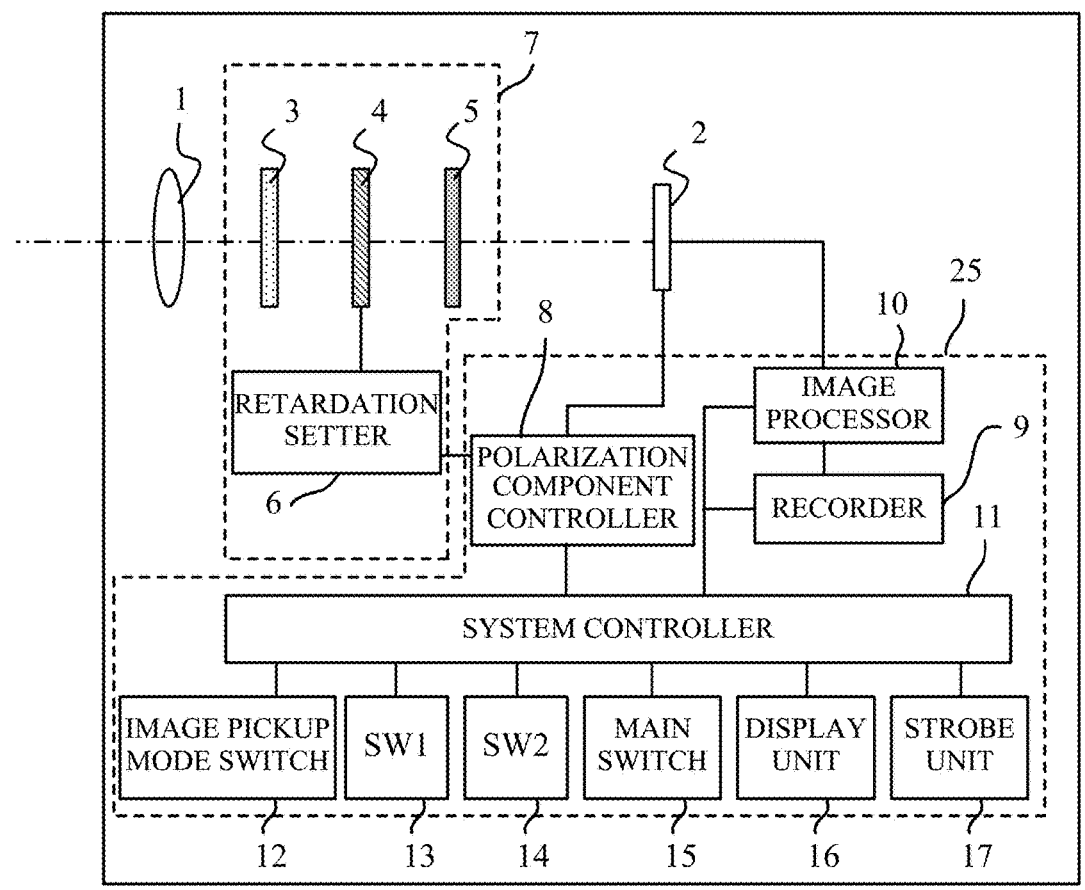
FIGS. 1A to 1C are configuration diagrams of an image pickup apparatus according to a first embodiment.

Referring now to the accompanying drawings, a detailed description will be given of embodiments of the present invention. Those elements in each figure, which are corresponding elements, will be designated by the same reference numerals, and a description thereof will be omitted.

First Embodiment

Figures 1B, 1C:
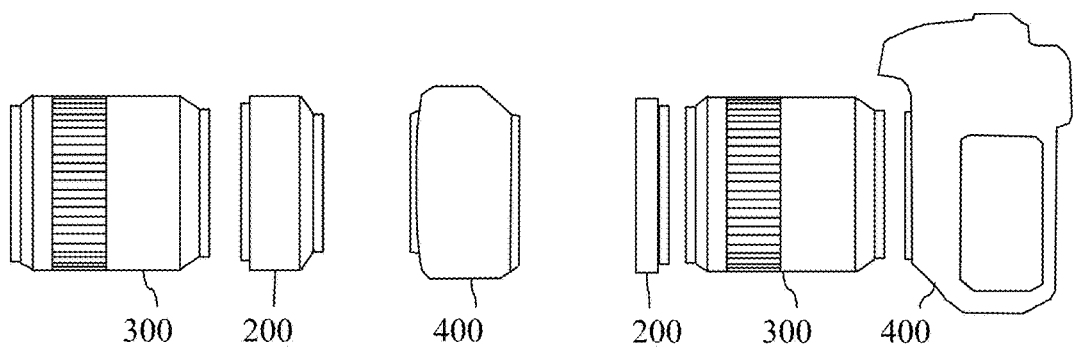

Referring to FIG. 1, a description will be given of a configuration an image pickup apparatus 100 according to this embodiment. FIG. 1A is a schematic diagram of a simplified configuration of the image pickup apparatus 100 according to this embodiment. An alternate long and short dash line in FIG. 1A represents an optical axis. The image pickup apparatus 100 includes an optical system 1 that images light from the object on the image pickup element 2, an image pickup element 2 that obtains image information of the object, a polarization obtainer 7 disposed between the optical system 1 and the image pickup element 2, and a control unit 25, such as a microcomputer. This embodiment disposes the polarization obtainer 7 between the optical system 1 and the image pickup element 2 on the optical path, but the present invention is not limited to this embodiment. As long as the polarization obtainer 7 may be disposed on the light incident side (object side) of the image pickup element 2, the polarization obtainer 7 may be disposed on the light incident side of the optical system 1 or among a plurality of optical elements in the optical system 1. The polarization obtainer 7 is disposed in the image pickup apparatus 100 in this embodiment but may be configured as an adapter 200 as an optical apparatus different from the image pickup apparatus 100, as illustrated in FIGS. 1B and 1C. The adapter 200 is attached to the lens unit or the digital camera having common mounts, and used for the lens 300 and the digital camera 400 at positions illustrated in FIGS. 1B and 1C when the polarization information is obtained. The adapter 200 can be attached to a lens integrated type digital camera and used.

The polarization obtainer 7 includes, in order from the light incident side, a quarter waveplate (first retardation plate) 3, a variable retardation plate (second retardation plate) 4, a polarizer 5, and a retardation setter 6. Axes of the quarter waveplate 3, the variable retardation plate 4, and the polarizer 5 are arranged on a plane (xy plane) perpendicular to the optical axis of the optical system 1. The quarter waveplate 3 includes an extension film and provides a relative retardation (or relative phase difference) of n/2 (rad) between the polarization components orthogonal to the incident light. The relative retardation of n/2 provided by the quarter waveplate 3 is unchangeable or fixed. This embodiment uses the quarter plate, but a third-quarter plate or a variable retardation plate may be used as long as it can provide a relative retardation of n/2. The variable phase plate 4 is an element using liquid crystal, and provides a relative retardation similar to that of the quarter waveplate 3 that provides a relative retardation (referred to as a "retardation of the variable retardation plate 4" hereinafter) between the polarization components orthogonal to the incident light which is variable according to the applied voltage. Thus, the retardation of the variable retardation plate 4 can be more quickly changed than a case where a plurality of retardation plates are changed or where one polarizer is rotated. The polarizer 5 transmits a component of the transmission axis direction (transmission polarization direction) among the polarization components of the incident light. Since the polarization obtainer 7 is used for the image pickup apparatus 100, the polarizer 5 may use a polarizer of absorbing unnecessary light. When the polarizer 5 uses a type of reflecting the unnecessary light, such as a wire grid polarizer, it reflects the polarized light to be cut and the reflected light becomes stray light and ghost, negatively affecting the image. Thus, the reflection type is unsuitable for the configuration of the image pickup apparatus 100. In order to reduce the influence of the ghost, the polarizer 5 may characteristically absorb 50% or more of the polarized light that oscillates in the direction orthogonal to the transmission axis. This polarizer may include, for example, a film made by extending a resin material containing an iodic compound, but the present invention is not limited to this example and an arbitrary absorption type polarizer may be used.

A working wavelength range is a wavelength range in which the image pickup apparatus 100 works, and can be selected by the wavelength characteristic of the image pickup element 2 and application. This embodiment sets the working wavelength range to a visible range (400 nm to 700 nm). The working wavelength range may be at least one of the visible range (400 nm to 700 nm), the near-infrared range (700 nm to 1100 nm), and the near-ultraviolet range (200 nm to 400 nm) based on the configuration of the image pickup apparatus 100. A designed wavelength λ (nm) for the polarization plate 5 and each retardation plate may be selected according to the working wavelength range obtained by the image pickup apparatus 100 so as to maintain the proper characteristic. The retardation setter 6 sets (changes) the retardation of the variable retardation plate 4 according to the signal (command) from the image pickup apparatus 100. This embodiment provides the retardation setter 6 in the polarization obtainer 7, but may provide it in the image pickup apparatus 100 separate from the polarization obtainer 7.

The control unit (control apparatus) 25 includes a polarization component controller 8, a recorder 9, an image processor 10, a system controller 11, an image pickup mode switch 12, a switch (SW1) 13, a switch (SW2) 14, a main switch 15, a display unit 16, and a strobe unit (light emitter) 17. The polarization component controller 8 outputs a control signal for the retardation of the variable retardation plate 4 to the retardation setter 6 in synchronization with the image pickup element 2. This control changes the polarization component of light from the object which the image pickup element 2 receives, and can provide an image having the polarization information of the object. The recorder 9 temporarily stores an image acquired from the image pickup element 2 in an unillustrated recording medium, such as a RAM. The image processor 10 processes the image acquired from the image pickup element 2. The system controller 11 controls operations of the image pickup apparatus 100. The image pickup mode switch 12 is a switch used to select an image pickup mode, such as a macro mode, a distant view mode, and a sports mode. The switch (SW1) 13 is used to set an image pickup condition, such as an AF (autofocus) and an AE (auto-exposure). The switch (SW2) 14 is used to capture an image. The main switch 15 is used to power on the image pickup apparatus 100. The display unit 16 displays an image, operation assisting information, and a state of the image pickup apparatus 100, and the like.

Figure 2A:
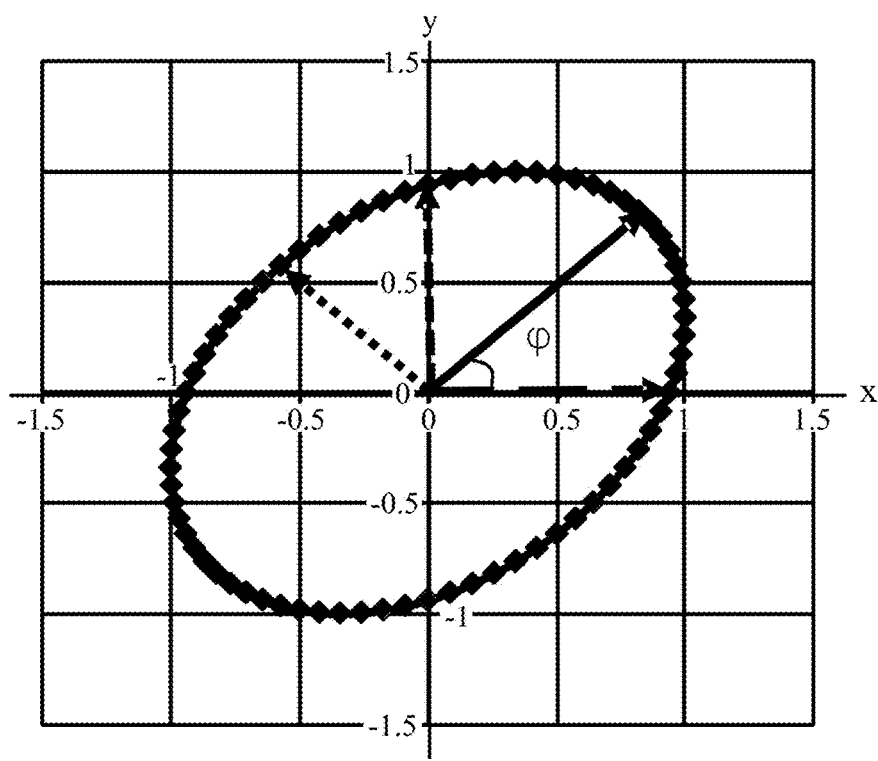
FIGS. 2A and 2B illustrate exemplary azimuth dependencies of a polarization state to a light intensity of incident light.
Figure 2B:
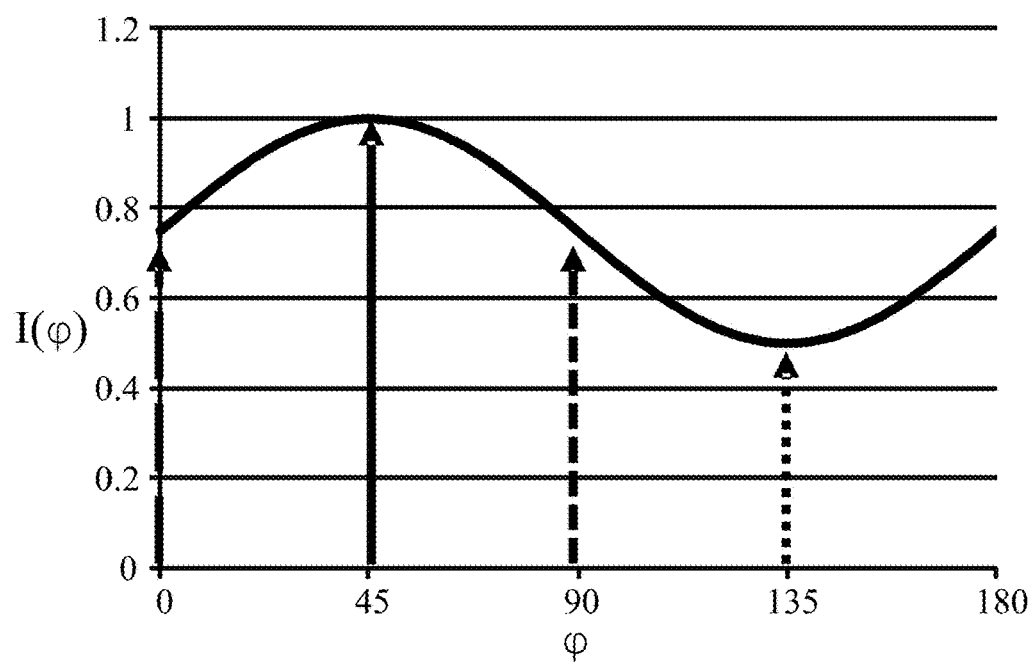

Referring now to FIGS. 2A and 2B, a description will be given of an azimuth dependency of a light intensity from a general object. An ellipse illustrated in FIG. 2A indicates an azimuth dependency of an amplitude of an illustrative polarization state, where φ is an azimuth angle (degree) to an x-axis direction of the polarization direction. FIG. 2B is a view where an abscissa axis denotes the azimuth angle φ and an ordinate axis denotes a light intensity I(φ) as a square of an elliptical radius in FIG. 2A for the azimuth angle φ. Arrows with different line types in FIG. 2A correspond to arrows of the same line type of arrows in FIG. 2B. The polarization component at the azimuth angle φ of 45 degrees has the highest light intensity in FIGS. 2A and 2B. Therefore, an image in which a characteristic of the object is most emphasized can be obtained by extracting two orthogonal polarization components at the azimuth angles φ of 45 degrees and 135 degrees.

Referring now to FIGS. 3A to 3D, a description will be given of a behavior of incident light entering the polarization obtainer 7 with a fixed transmitting axis direction of the polarizer 5 and the retardation of the variable retardation plate 4 that is set to be constant. FIGS. 3A to 3D illustrate transmittance dependencies of the polarization obtainer 7 for the polarization direction of the incident light. FIGS. 3A to 3D set the retardation of the variable retardation plate 4 to λ/4 where the design wavelength is λ (nm). The arrow direction and length before and after the transmission through the polarization obtainer 7 represent the polarization azimuth and intensity, respectively. A broken-line arrow on each of the quarter wavelength 3 and the variable retardation plate 4 represents the slow axis direction, and a broken-line arrow on the polarizer 5 represents the transmitting axis direction. In other words, each of the slow axis direction of the quarter wavelength 3 and the transmitting axis direction of the polarizer 5 is parallel to the y-axis direction. However, they may not be strictly parallel to the y-axis direction and can be considered substantially parallel (almost parallel) even if they shift from the y-axis direction by several degrees. Each of the slow axis direction of the quarter wavelength 3 and the transmitting axis direction of the polarizer 5 relative to the x-axis direction forms an azimuth angle φ of 90 degrees. However, it may not be strictly 90 degrees and considered substantially or almost 90 degrees even if the azimuth angle shifts by several degrees. The azimuth angle φ of the slow axis direction of the variable retardation plate 4 relative to the x-axis is 45 degrees. However, it may not be strictly 45 degrees and considered to be substantially 45 degrees (almost 45 degrees) even if the azimuth angle shifts by several degrees. The fast axis direction of the quarter plate 3 and the transmitting axis direction of the polarizer 5 may be parallel to the y-axis direction. In this case, the azimuth angle φ of the fast axis direction of the variable retardation plate 4 relative to the x-axis direction is 45 degrees.

Figures 3A, 3B, 3C, 3D:
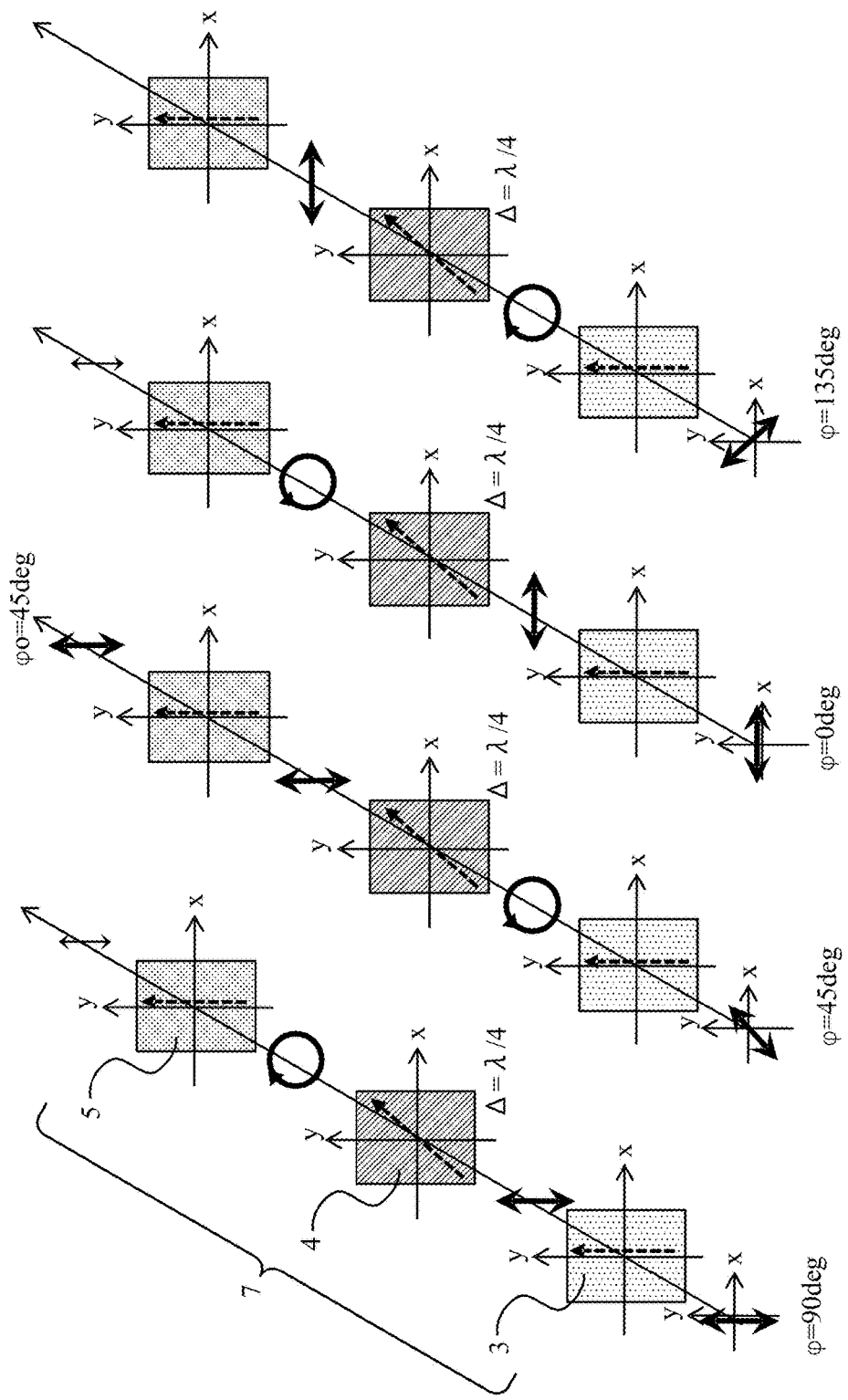
FIGS. 3A to 3D illustrate transmittance dependencies of a polarization obtainer to a polarization direction of incident light.

FIG. 3A illustrates an incident polarization component with an azimuth angle φ of 90°. The incident light transmits through the quarter waveplate 3 without being affected by the phase change, since the polarization direction is parallel to the slow axis direction of the quarter waveplate 3. The light that has transmitted through the quarter waveplate 3 is converted into rightward circularly polarized light by the variable retardation plate 4, and becomes linearly polarized light having an intensity of about 50% of the incident light after transmitting through the polarizer 5.

FIG. 3B illustrates an incident polarization component with an azimuth angle φ of 45 degrees. The incident light is converted into leftward circularly polarized light by the variable retardation plate 4. The light that has transmitted through the quarter waveplate 3 is converted into linearly polarized light having an azimuth angle φ of 90 degrees in the polarization direction by the variable retardation plate 4 and parallel to the transmitting axis direction of the polarizer 5. Thus, the resultant light transmits through the polarizer 5 with few losses.

FIG. 3C illustrates an incident polarization component with an azimuth angle φ of 0 degrees. The incident light transmits through the quarter waveplate 3 without being affected by the phase change, since the polarization direction is orthogonal to the slow axis direction of the quarter waveplate 3. The light that has transmitted through the quarter waveplate 3 is converted into leftward circularly polarized light by the variable retardation plate 4, and becomes linearly polarized light having an intensity of about 50% of the incident light after transmitting through the polarizer 5.

FIG. 3D illustrates an incident polarization component with an azimuth angle φ of 135 degrees. The incident light is converted into rightward circularly polarized light by the quarter waveplate 3. The light that has transmitted the quarter waveplate 3 is converted into linearly polarized light having an azimuth angle φ of 0 degrees in the polarization direction by the variable retardation plate 4 and orthogonal to the transmitting axis direction of the polarizer 5. Thus, the resultant light rarely transmits through the polarizer 5.

When the retardation of the variable retardation plate 4 is λ/4, the transmittance of the polarization component with the azimuth angle φ of 45 degrees becomes maximum in the polarization component of the incident light on the polarization obtainer 7. Hereinafter, φ$_o$ (degree) is an angle (maximum transmission angle) of the polarization component relative to the x-axis direction, which provides the maximum transmittance in the polarization component of the incident light on the polarization obtainer 7.

Figure 4:
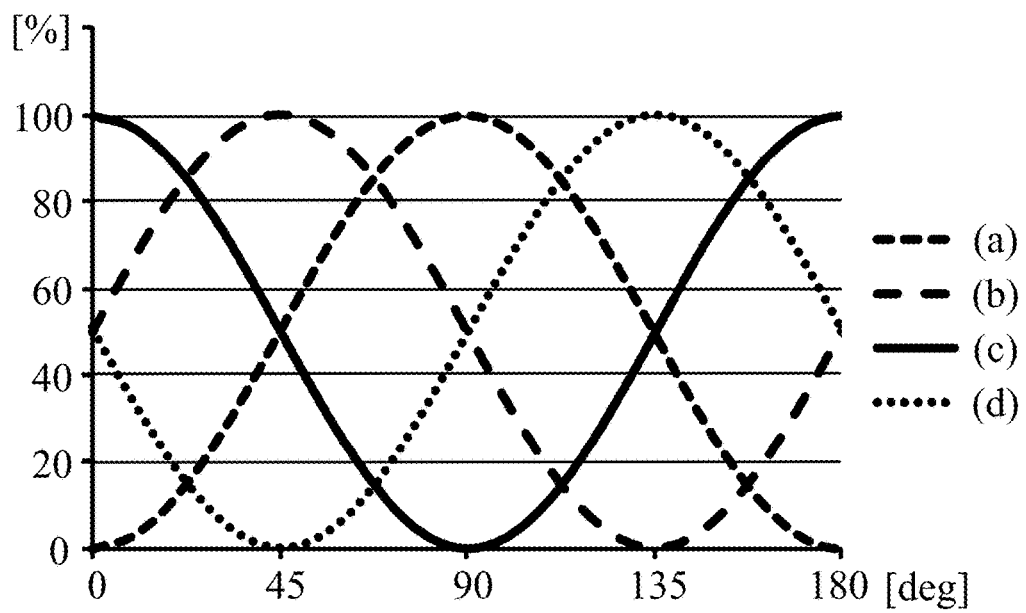
FIG. 4 illustrates a transmittance dependency of the polarization obtainer to the polarization direction of the incident light for each retardation of a variable retardation plate.

FIG. 4 illustrates a relationship between the azimuth angle φ of the polarization component of the incident light and the transmittance T(φ) of the polarization obtainer 7 for each retardation of the variable retardation plate 4. Lines (a) to (d) in FIG. 3 represent the retardations of 0, λ/4, λ/2, and 3λ/4 set to the variable retardation plate 4. For example, in the line (a), the transmittance T(φ) is 100% when the azimuth angle φ is 90 degrees, and the maximum transmission angle φ$_o$ is 90 degrees. Similarly, in the lines (b), (c), and (d), the maximum transmission angles φ$_o$ are 45 degrees, 0 degrees, and 135 degrees (−45 degrees). As discussed, the maximum transmission angle φ$_o$ and the retardation Δψ (degree) of the variable retardation plate 4 are expressed as follows:

$$\varphi_o = 90 - \Delta\psi/2 \quad (1)$$

The transmitting polarization direction can be controlled by controlling the retardation of the variable retardation plate 4 based on the expression (1).

Figure 5:
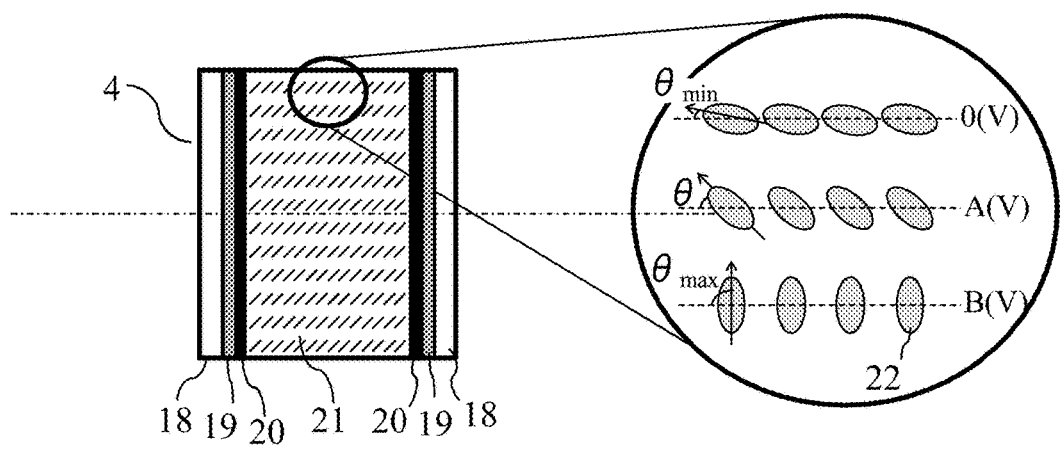
FIG. 5 is a configuration diagram of the variable retardation plate.

Referring now to FIG. 5, a description will be given of a configuration of the variable retardation plate 4. FIG. 5 is a configuration diagram of the variable retardation plate 4, and a circle in FIG. 5 enlarges the liquid crystal layer. The variable retardation plate 4 includes substrates 18, electrode layers 19, alignment films 20, and a liquid crystal layer 20 held by the substrates 18, the electrode layers 19, and the alignment films 20. The liquid crystal layer 21 is a VA type liquid crystal layer (VA liquid crystal layer), and liquid crystal molecules 22 follow the alignment film 20. When the applied voltage is changed in order from 0 [V] to A [V] and B (>A) [V], the tilt angle of the liquid crystal molecule 22 changes from a minimum value θ$_{min}$ (degree) to a maximum value θ$_{max}$ (degree) through an intermediate value θ (degree). The retardation setter 6 applies the voltage to the variable retardation plate 4, controls the tilt angle θ of the liquid crystal molecule 22 or the refractive index anisotropy, and changes the retardation of the variable retardation plate 4. Assume that a maximum retardation Δψ$_{max}$ (degree) is a retardation when the tilt angle has a maximum value θ$_{max}$ (degree) and a minimum retardation Δψ$_{min}$ (degree) is a retardation when the tilt angle has a minimum value θ$_{min}$ (degree). Then, the phase change amount is expressed by a difference between the maximum retardation Δψ$_{max}$ and the minimum retardation Δψ$_{min}$. This embodiment may use, but is not limited to, the VA liquid crystal. For example, the present invention can use a variety liquid crystals, such as the TN liquid crystal and the OCB liquid crystal.

The image pickup apparatus 100 in this embodiment fixes the transmitting axis direction of the polarizer 5, temporally changes the retardation of the variable retardation plate 4, captures a plurality of images having different polarization states, and obtains polarization information of the object based on the plurality of captured images. In general, the retardation of the retardation plate has a wavelength dispersion. The maximum transmission angle φ$_o$ changes according to the wavelength of the incident light and the expression (1). Where Δψ(λ) (degree) is the retardation at the design wavelength λ and φ$_o$(λ) is the maximum transmission angle, the retardation of the variable wavelength plate 4 may be set so as to have an intended retardation at the representative wavelength λ$_d$ in the working wavelength. For example, the retardation Δψ(λ$_d$) may be set to 0 degrees, 90 degrees, 180 degrees, and 270 degrees. The retardation Δψ(λ) and the maximum transmission angle φ$_o$(λ) for another wavelength in the working wavelength changes from the designed value according to the wavelength dispersion, but the polarization information for an arbitrary wavelength can be calculated by previously measuring the dispersion characteristic.

When the retardation of the variable retardation plate 4 has a wavelength dispersion, the image acquired with the polarization obtainer 7 has coloring. As the retardation of the variable retardation plate 4 increases, a difference of the retardation increases due to the wavelength and a difference of the maximum transmission angle $\varphi_o$ increases. As a result, coloring in the image becomes more conspicuous. In addition, as the retardation changes, the coloring state and the brightness of the image change. Thus, a problem may occur when the image pickup condition is set for each retardation in obtaining the polarization information by changing the retardation. The image pickup condition contains, for example, an exposure relating (shutter speed, ISO speed, and F-number) setting condition, a white balance relating setting condition, a strobe relating (light emitter) setting condition, and a focus relating setting condition.

More specifically, when the white balance is set based on the image acquired with a large retardation of the variable retardation plate 4, the acquired image has coloring and the white balance cannot correctly be set. In addition, when images are captured by significantly changing the retardation, such as 0 degrees, 90 degrees, 180 degrees, and 270 degrees, the coloring state and brightness of the image differ according to the retardation. Thus, each of the setting conditions relating to the exposure, the strobe, and the focus may change according to the retardation. In particular, since it is difficult to correct the strobe relating setting condition (light emission existence and illuminance) and the focus relating setting condition after the image is captured, the polarization information may not be correctly acquired based on a plurality of images captured with different conditions. In addition, since it is difficult to correct the exposure relating setting condition (in particular, F-number) after the image is captured, the polarization information may not be correctly acquired based on a plurality of images captured with different conditions.

Accordingly, this embodiment sets the image pickup condition sets the image pickup condition while the retardation of the variable retardation plate 4 is set to a "reference value" as a value in a common, sufficiently small, and predetermined range. The reference value may be a value from −90 degrees to +90 degrees inclusive, −45 degrees to +45 degrees inclusive, or −20 degrees to +20 degrees inclusive.

Referring now to a flowchart of FIG. 6, a description will be given of an image pickup control method executed by the system controller 11 in the image pickup apparatus 100. FIG. 6 is a flowchart of the control method. The flowchart in FIG. 6 can be implemented as a control program that enables a computer to execute a function of each step. Each step in FIG. 6 may be executed by a control apparatus separate from the image pickup apparatus 100. The control program may be installed in the unillustrated recorder (storage unit) in the image pickup apparatus 100 or a control apparatus different from the image pickup apparatus 100. The control program may be stored, for example, in a non-transitory computer-readable storage medium.

In the step S101, the system controller 11 determines whether the switch 13 has been pressed. When the system controller 11 determines that the switch 13 has been pressed, the flow moves to the step S102, and when the system controller 11 does not determine that the switch 13 has been pressed, the flow moves to the step S107.

In the step S102, the system controller 11 sets the retardation of the variable retardation plate 4 to the reference value via the retardation setter 6. The driving control characteristic when the retardation of the variable retardation plate 4 is set to the maximum retardation $\Delta\psi_{max}$ and the minimum retardation $\Delta\psi_{min}$ is superior to and has errors fewer than that when the retardation of the variable retardation plate 4 is set to a retardation as an intermediate value (intermediate retardation). Thus, the frequently set reference value may be the minimum retardation $\Delta\psi_{min}$. In addition, a relationship between the voltage applied to the variable retardation plate 4 and the retardation differs according to the liquid crystal type. For example, in one type, the retardation becomes maximum when no voltage is applied, and the retardation decreases as the voltage is increased. In another type, the retardation becomes minimum when no voltage is applied, and the retardation increases as the voltage is increased. Since the reference value obtained with a lower voltage is advantageous in view of the consumption power, the variable retardation plate 4 may be the type that provides the minimum retardation when no voltage is applied. In this embodiment, the minimum retardation $\Delta\psi_{min}$ is 6 degrees for the incident light having the wavelength of 530 nm and the applied voltage at this time is 0V. The maximum retardation $\Delta\psi_{max}$ is 180 degrees.

In the step S103, the system controller 11 sets the image pickup condition. In the step S104, the system controller 11 determines whether the switch 14 has been pressed. When the system controller 11 determines that the switch 14 has been pressed, the flow moves to the step S105, and when the system controller 11 does not determine that the switch 14 has been pressed, the flow moves to the step S107.

In the step S105, the system controller 11 sets the retardation of the variable retardation plate 4 to the "image pickup value" via the retardation setter 6. This embodiment changes the retardation of the variable retardation plate 4 and captures images more than three times, and the retardation of the variable retardation plate 4 set in acquiring each image is referred to as an "image pickup value." One of three or more image pickup values may be the reference value. This setting can reduce the number of set retardations. The image pickup value equal to the reference value may be the minimum value among the three or more image pickup values. This setting can minimize coloring in the image.

In this embodiment, the system controller 11 sets the retardations of the variable retardation plate 4 for each acquisition of an image to the three image pickup values, such as the minimum retardation $\Delta\psi_{min}$, the maximum retardation $\Delta\psi_{max}$, the average between them (($\Delta\psi_{min}$+ $\Delta\psi_{max}$)/2) but the present invention is not limited to this embodiment. The retardation of the variable retardation plate 4 is variable according to the applied voltage in a range from the minimum retardation $\Delta\psi_{min}$ to the maximum retardation $\Delta\psi_{max}$ inclusive but the image pickup value may include at least one of the minimum retardation $\Delta\psi_{min}$ and the maximum retardation $\Delta\psi_{max}$. In addition, the retardation of the variable retardation plate 4 may contain both the minimum retardation $\Delta\psi_{min}$ and the maximum retardation $\Delta\psi_{max}$. This is because the driving control characteristic when the retardation of the variable retardation plate 4 is set to the maximum retardation $\Delta\psi_{max}$ and the minimum retardation $\Delta\psi_{min}$ is superior to that when the retardation of the variable retardation plate 4 is set to the retardation as an intermediate value (intermediate retardation), as described above. Moreover, the retardation set to the maximum retardation $\Delta\psi_{max}$ and the minimum retardation $\Delta\psi_{min}$ changes due to the incident angle, less than the retardation set to the intermediate retardation.

While the system controller 11 sets three image pickup values in this embodiment, the present invention is not limited to this embodiment. For example, the system controller 11 may set the retardation of the variable retardation plate 4 to four or more image pickup values so as to capture four or more images. Although the four or more image captures increases the number of images, they provide effects of correcting the incident angular characteristic of the image pickup element using the image pickup information after the fourth image capture, of acquiring the wavelength characteristic, and of confirming the polarization acquisition precision, etc.

In the step S106, the system controller 11 makes the image pickup apparatus 100 execute exposure. In the step S107, the system controller 11 determines whether the image pickup apparatus 100 has been operated for a predetermined time period. When the system controller 11 determines that the image pickup apparatus 100 has been operated, the flow returns to the step S101, and when the system controller 11 does not determine that the image pickup apparatus 100 has been operated, the flow ends. After the flow ends, the image pickup apparatus 100 may be left as it is, but the present invention is not limited to this embodiment. For example, the image pickup apparatus 100 may be powered off or turned into the sleep mode.

As described above, the system controller 11 in this embodiment sets the retardation of the variable retardation plate 4 to the reference value equal to or smaller than 20 degrees from when the switch 13 is pressed to when the switch 14 is pressed. In other words, while the system controller 11 sets the image pickup condition, the retardation of the variable retardation plate 4 is set to the reference value. Therefore, the image that has passed the polarization obtainer 7 has no coloring caused by a wavelength dispersion, and the image pickup condition, such as the AF, AE and AWB (automatic white balance) can be consequently set without being negatively affected by the coloring. The image pickup condition is automatically set as in the AF, AE, and AWB, after the switch 13 is turned on and the photometry is performed. Thus, the system controller 11 may set the retardation of the variable retardation plate 4 to the reference value before the photometry starts.

The photographer may set the retardation (image pickup value) used for the image pickup for each image pickup, but the system controller 11 may count the number of image captures and sequentially set the retardation of the variable retardation plate 4 to the predetermined image pickup value according to the image pickup number. Referring now to the flowchart in FIG. 7, a description will be given of this control method. The flowchart illustrated in FIG. 7 can be implemented as a control program that enables the computer to execute a function of each step. Each step in FIG. 7 may be executed by a control apparatus separate from the image pickup apparatus 100. The control program may be installed in the unillustrated recorder (storage unit) in the image pickup apparatus 100 or an apparatus different from the image pickup apparatus 100. The control program may be stored, for example, in a non-transitory computer-readable storage medium.

Since the flow in FIG. 7 is basically similar to that illustrated in FIG. 6, only part different from the flow in FIG. 6 will be described. In the step S201, the system controller 11 sets the image pickup number N to 1. The steps S202 to S207 correspond to the steps S101 to S106 in FIG. 6. In the step S206, the system controller 11 sets the retardation of the variable retardation plate 4 to the image pickup value according to the image pickup number N. In the step S208, the system controller 11 sets the image pickup number N to N+1. The step S209 corresponds to the step S107 in FIG. 6. When the system controller 11 determines that the switch 14 has been pressed in the step S209, the similar operation is repeated. If the image pickup number N exceeds the predetermined number n for the image pickup value, for example, if the image pickup number N is n+1, the image pickup number N is considered to be 1 and if the image pickup number N is n+2, the image pickup number is considered to be 2. Then, the system controller 11 executes the flow in FIG. 7.

As described above, the system controller 11 controls the operation of the image pickup apparatus 100 using the flow in FIG. 7, and the photographer can set the retardation of the variable retardation plate 4 for each image capture without designating the image pickup value. Therefore, the photographer can quickly capture a plurality of images.

In addition, the system controller 11 may provide control such that the image pickup apparatus 100 can execute the necessary number of image captures to acquire the polarization information. Referring now to a flowchart illustrated in FIG. 8, a description will be given of this control method. The flowchart illustrated in FIG. 8 can be implemented as a control program that enables a computer to execute a function of each step. Each step in FIG. 8 may be executed by a control apparatus separate from the image pickup apparatus 100. The control program may be installed in the unillustrated recorder (storage unit) in the image pickup apparatus 100 or an apparatus different from the image pickup apparatus 100. The control program may be stored, for example, in a non-transitory computer-readable storage medium. When the system controller 11 executes the flow in FIG. 8, the number n necessary to acquire the polarization information and the image pickup value corresponding to the image pickup number are previously set.

The steps S301 to S304 correspond to the steps S101 to S104 in FIG. 6. In the step S305, the system controller 11 sets the image pickup number N to 1. In the step S306, the system controller 11 sets the retardation of the variable retardation plate 4 to the image pickup value according to the image pickup number N. In the step S307, the system controller 11 makes the image pickup apparatus 100 execute exposure. In the step S308, the system controller 11 compares the image pickup number N with the preset image pickup number (the number of image captures) n. When the system controller 11 determines that the image pickup number N is smaller than the image pickup number n, the flow moves to the step S309, and when the system controller 11 determines that the image pickup number N is equal to the image pickup number n, the flow moves to the step S310 corresponding to the step S107 in FIG. 6. In the step S309, the system controller 11 sets the image pickup number N to N+1. Thereafter, the image pickup apparatus 100 executes exposure while the retardation of the variable retardation plate 4 is set to the image pickup value according to the image pickup number.

Figure 8:
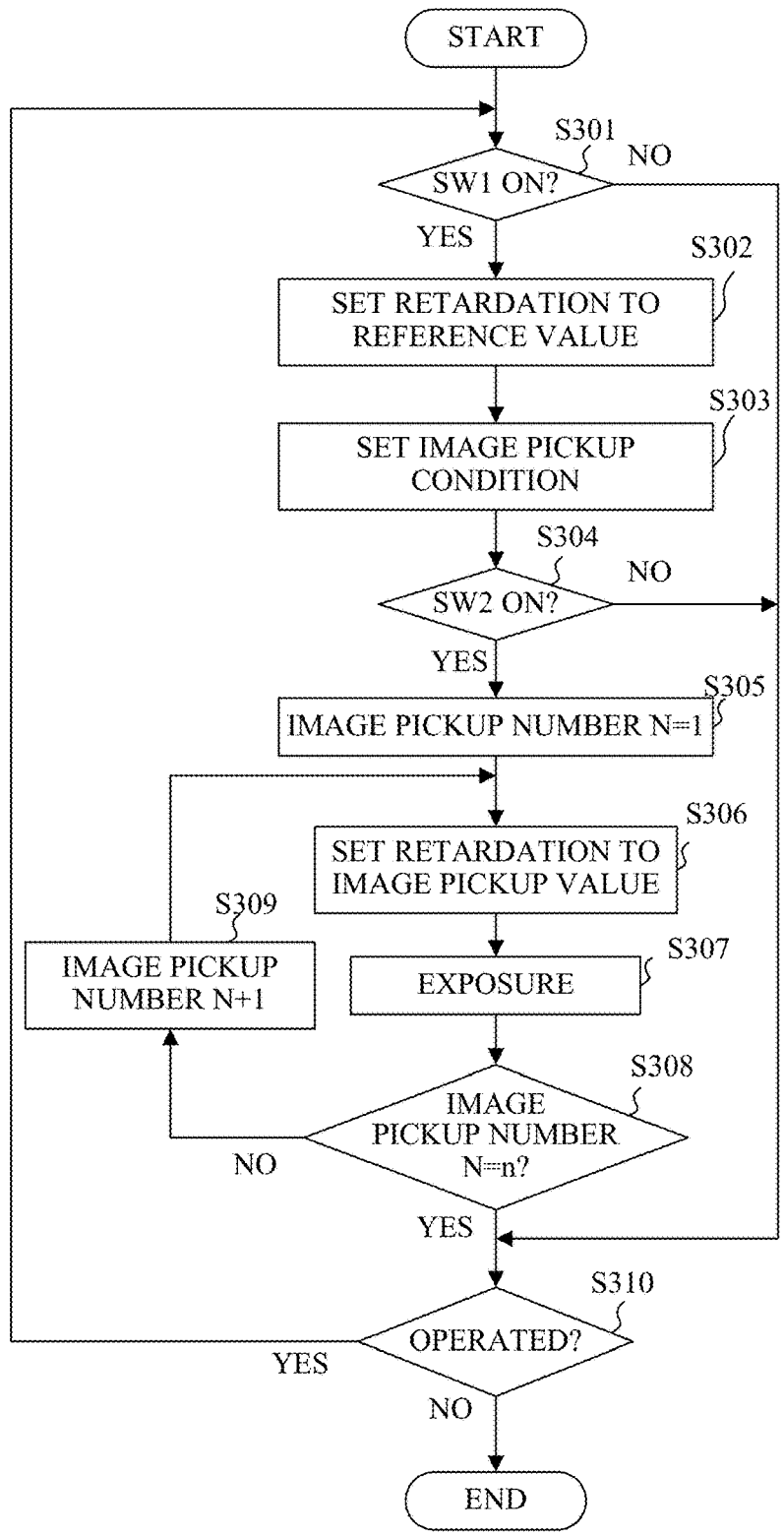
FIG. 8 is a flowchart of the control method according to the first embodiment.

As described above, the system controller 11 controls the operation of the image pickup apparatus 100 using the flow illustrated in FIG. 8, and can capture images necessary to acquire the polarization information more simply in a short time period.

Each of a plurality of images obtained by the above method has different polarization information and can be used as it is without receiving calculation processing, such as image processing. However, the image obtained with a large retardation of the variable retardation plate 4 has coloring due to a wavelength dispersion, which is not seen in the original object. Thus, the image output as it is may be an image acquired when the retardation is set to the reference value.

An image in which a characteristic of an object is more highlighted can be obtained with a pixel unit through calculation processing applied to images having different polarization information. For example, an image in which a scattering light component of the object is emphasized and an image in which a regular reflection component from the object is emphasized can be obtained by generating the image only with the lowest light intensity value or by generating the image only with the highest light intensity value in the obtained data. The light intensity value of the polarized light may be a direct value of the image obtained by the polarization obtainer 7 or an interpolated or extrapolated value obtained from the ellipsometry. The interpolation and the extrapolation use an estimated value obtained from the ellipsometric result so as to highlight and restrain the obtained polarization intensity difference.

Thus, an image in which a characteristic amount (feature amount) is emphasized or restrained can be obtained by optically obtaining the information of the object. A combination of these images will provide an image intended by the photographer. Moreover, an image may have different polarization information or a highlighting effect for each area on the image. For example, when images having different polarization states are combined for a main object and a background, such as a sky, the background color can be made uniform or an image in which each of the background and the main object is highlighted can be generated. An image suitable for the purpose can also be acquired through various processing by utilizing the polarization intensity dependency of the object.

A description will now be given of a method for analyzing polarization information through the image processor 10 based on three or more images obtained with one of the flows in FIGS. 6 to 8. In this embodiment, three images are obtained. Each obtained image has polarization information for each pixel. Assume that $I_{MAX}$ is the maximum luminance value and $I_{MIN}$ is the minimum luminance value in the calculated luminance values $I(\varphi)$, and $\alpha$ (degree) is an azimuth angle (maximum azimuth angle) corresponding to the maximum luminance value $I_{MAX}$. Then, a luminance value $I(\varphi)$ to the azimuth angle $\varphi$ is expressed as follows.

$$I(\varphi)=(I_{MAX}-I_{MIN})\cdot\cos^2(\varphi-\alpha)+I_{MIN} \quad (2)$$

A change of the luminance value $I(\varphi)$ can be calculated by plotting three luminance values of one predetermined pixel in each image for the image capturing azimuth angle, by performing fitting using the least-square method, and by calculating the maximum luminance value $I_{MAX}$, the minimum luminance value $I_{MIN}$, and the maximum azimuth angle $\alpha$.

Figure 9A:
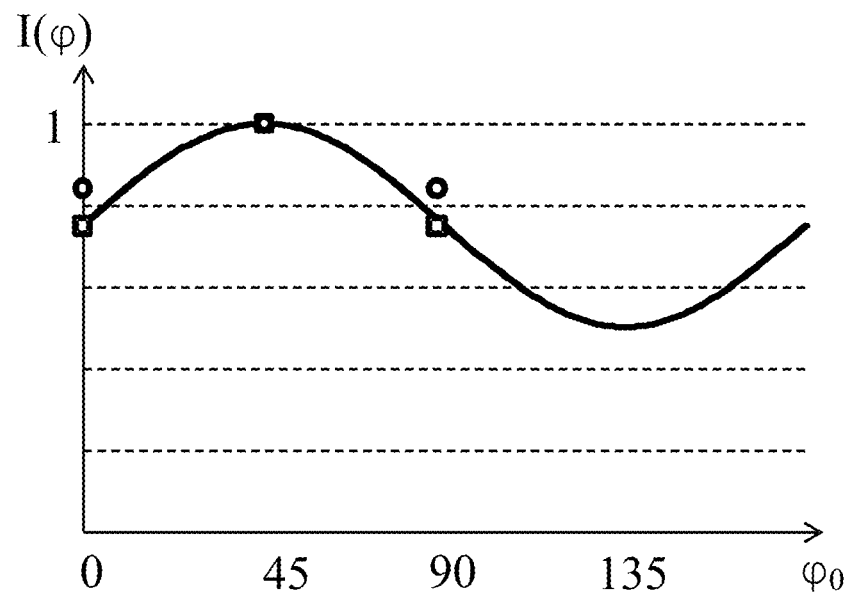
FIGS. 9A and 9B illustrate a relationship between an azimuth angle and a luminance value.
Figure 9B:
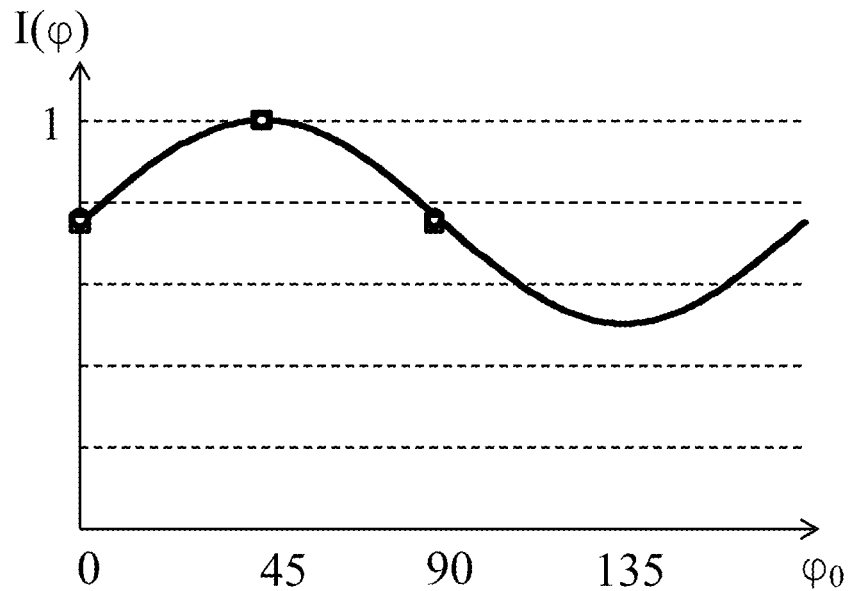
Figure 10D:
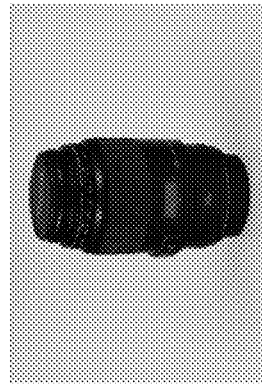
FIGS. 10A to 10D illustrate synthesized images.
Figure 10C:
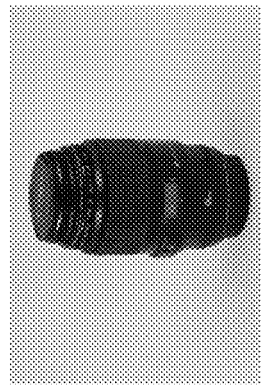
Figure 10B:
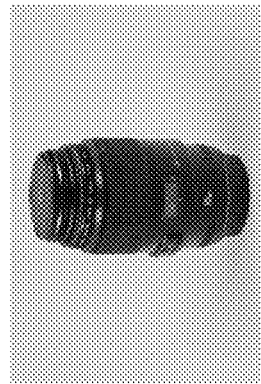
Figure 10A:
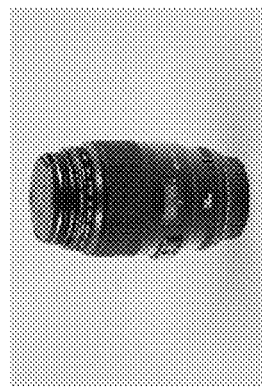
Figure 11C:
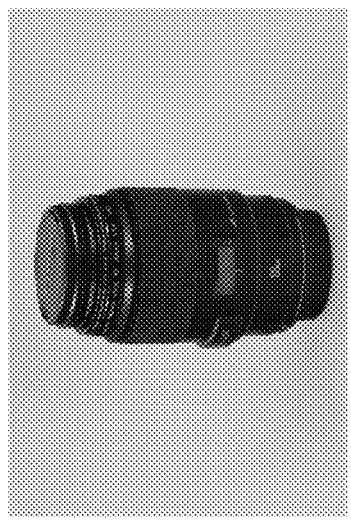
FIGS. 11A to 11F illustrate synthesized images.
Figure 11B:
Figure 11A:
Figure 11F:
Figure 11E:
Figure 11D:

FIGS. 9A and 9B are views made by plotting the luminance values in one predetermined pixel for the maximum transmission angle $\varphi_o$. The maximum transmission angle $\varphi_o$ is calculated with the image pickup value (retardation of the variable retardation plate 4) set for each image pickup and the expression (1). Circles in FIGS. 9A and 9B represent obtained luminance values and squares in FIGS. 9A and 9B represent the polarization information, such as the maximum luminance value $I_{MAX}$, the minimum luminance value $I_{MIN}$, and the maximum azimuth angle $\alpha$. FIG. 9A is a view made by using the luminance value of the pixel as it is. FIG. 9B is a view made by using the luminance value of the pixel in which the influence of the transmittance of the polarization obtainer 7 is eliminated. As illustrated in FIGS. 9A and 9B, a drop of an extinction ratio in acquiring the polarization information can be partially reduced by considering the influence of the transmittance of the polarization obtainer 7.

The image pickup element 2 in this embodiment includes R, G, and B color filters, and thus each image has RGB luminance information. Thus, the polarization information for each pixel, such as the maximum luminance value $I_{MAX}$, the minimum luminance value $I_{MIN}$, and the maximum azimuth angle $\alpha$, is calculated for each of R, G, and B. This embodiment uses a value at a wavelength that maximizes the transmittance in each color filter, for the retardation in calculating the maximum transmission angle $\varphi_o$ for RGB. More specifically, this embodiment uses retardations $\Delta\psi(610 \text{ nm})$, $\Delta\psi(530 \text{ nm})$, and $\Delta\psi(470 \text{ nm})$ at the maximum transmittance wavelengths (R=610 nm, G=530 nm, and B=470 nm) of respective color filters. The maximum transmission angles $\varphi_o(610 \text{ nm})$, $\varphi_o(530 \text{ nm})$, and $\varphi_o(470 \text{ nm})$ are calculated using respective retardations. Use of these values will restrain the influence of the wavelength dispersion of the retardation and provide more precise polarization information.

The image processor 10 generates an image using the calculated polarization information, such as the maximum luminance value $I_{MAX}$, the minimum luminance value $I_{MIN}$, and the maximum azimuth angle $\alpha$. FIGS. 10A to 10D illustrate synthesized images made by synthesizing images where the luminance value I of each pixel is set to $I=I_{MIN}+x\cdot(I_{MAX}-I_{MIN})$ (x=0, 0.5, 1.0, and 1.5). As illustrated in FIGS. 10A to 10D, the image processor 10 can generate a synthesized image having different shined sense on the surface based on the maximum luminance value $I_{MAX}$ and the minimum luminance value $I_{MIN}$ in the polarization information. FIGS. 11A to 11F illustrate synthesized images where the luminance value I of each pixel is set to $I=(I_{MAX}-I_{MIN})\cdot\cos^2(\varphi_x-\alpha)+I_{MIN}$ ($\varphi_x$=0 degrees, 30 degrees, 60 degrees, 90 degrees, 120 degrees, and 150 degrees). As illustrated in FIGS. 11A to 11F, the image processor 10 can generate a synthesized image in an arbitrary transmission axis direction (that may not be obtained in the image capture) using the obtained polarization information, such as the maximum luminance value $I_{MAX}$, the minimum luminance value $I_{MIN}$, and the maximum azimuth angle $\alpha$, after the images are captured. The synthesized image generated by the image processor 10 is a colored image, but FIGS. 10A to 10D and 11A to 11F convert the synthesized images into monochromatic images. The recorder 9 may store the synthesized image.

While the image processor 10 calculates the polarization information and synthesizes the images using the polarization information in this embodiment, the information processing apparatus different from the image pickup apparatus 100 may perform these processes.

Second Embodiment

In the manual mode, the photographer arbitrarily sets the image pickup condition usually at almost any timings except during the image pickup (exposure) period. Therefore, the retardation of the variable retardation plate 4 may be set to the reference value while the photographer can set the image pickup condition except during the image pickup period in the manual mode.

Figure 12:
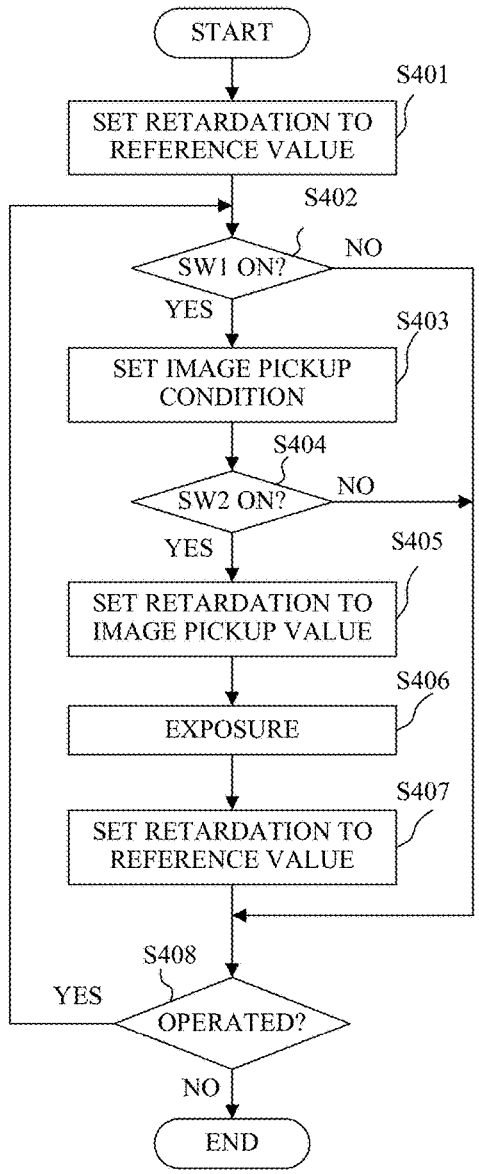
FIG. 12 is a flowchart of a control method according to a second embodiment.

The configuration of the image pickup apparatus 100 in this embodiment is similar to that of the first embodiment. Referring now to FIG. 12, a description will be given of an image pickup control method by the image pickup apparatus 100 executed by the system controller 11. FIG. 12 is a flowchart of the control method. The flowchart illustrated in FIG. 12 can be implemented as a control program that enables a computer to execute a function of each step. Each step in FIG. 12 may be executed by a control apparatus separate from the image pickup apparatus 100. The control program may be installed in the unillustrated recorder (storage unit) in the image pickup apparatus 100 or a control apparatus different from the image pickup apparatus 100. The control program may be stored, for example, in a non-transitory computer-readable storage medium.

In the step S401, the system controller 11 sets the retardation of the variable retardation plate 4 to the reference value equal to or smaller than 20 degrees via the retardation setter 6. In the step S402, the system controller 11 determines whether the switch has been pressed. When the system controller 11 determines that the switch 13 has been pressed, the flow moves to the step S403, and when the system controller 11 does not determine that the switch 13 has been pressed, the flow moves to the step S408. In the step S403, the system controller 11 sets the image pickup condition. In the step S404, the system controller 11 determines whether the switch 14 has been pressed. When the system controller 11 determines that the switch 14 has been pressed, the flow moves to the step S405, and when the system controller 11 does not determine that the switch 14 has been pressed, the flow moves to the step S408. In the step S405, the system controller 11 sets the retardation of the variable retardation plate 4 to the image pickup value via the retardation setter 6. In the step S406, the system controller 11 makes the image pickup apparatus 100 execute exposure. In the step S407, the system controller 11 sets the retardation of the variable retardation plate 4 to the reference value via the retardation setter 6. In the step S408, the system controller 11 determines whether the image pickup apparatus 100 has been operated in a predetermined time period. When the system controller 11 determines that the image pickup apparatus 100 has been operated, the flow returns to the step S101, when the system controller 11 does not determine that the image pickup apparatus 100 has been operated, the flow ends.

As described above, the system controller 11 in this embodiment sets the retardation of the variable retardation plate 4 to the reference value from when setting of the image pickup condition ends to when the exposure ends in the image pickup apparatus 100 except during the exposure period. Therefore, except during the image pickup period, the image that has passed the polarization obtainer 7 does not contain coloring caused by the wavelength dispersion. As a result, the viewfinder image or the live-view image does not contain coloring that is not originally included, and the photographer can capture an image without an uncomfortable feeling from the viewfinder image or the live-view image.

Figure 13:
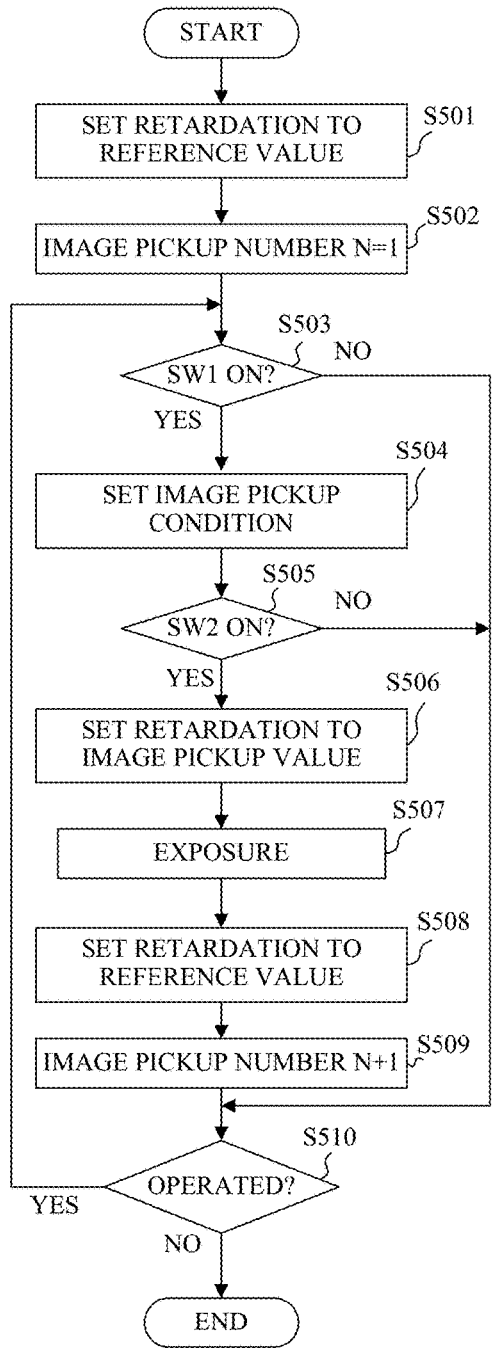
FIG. 13 is a flowchart of the control method according to the second embodiment.
Figure 14:
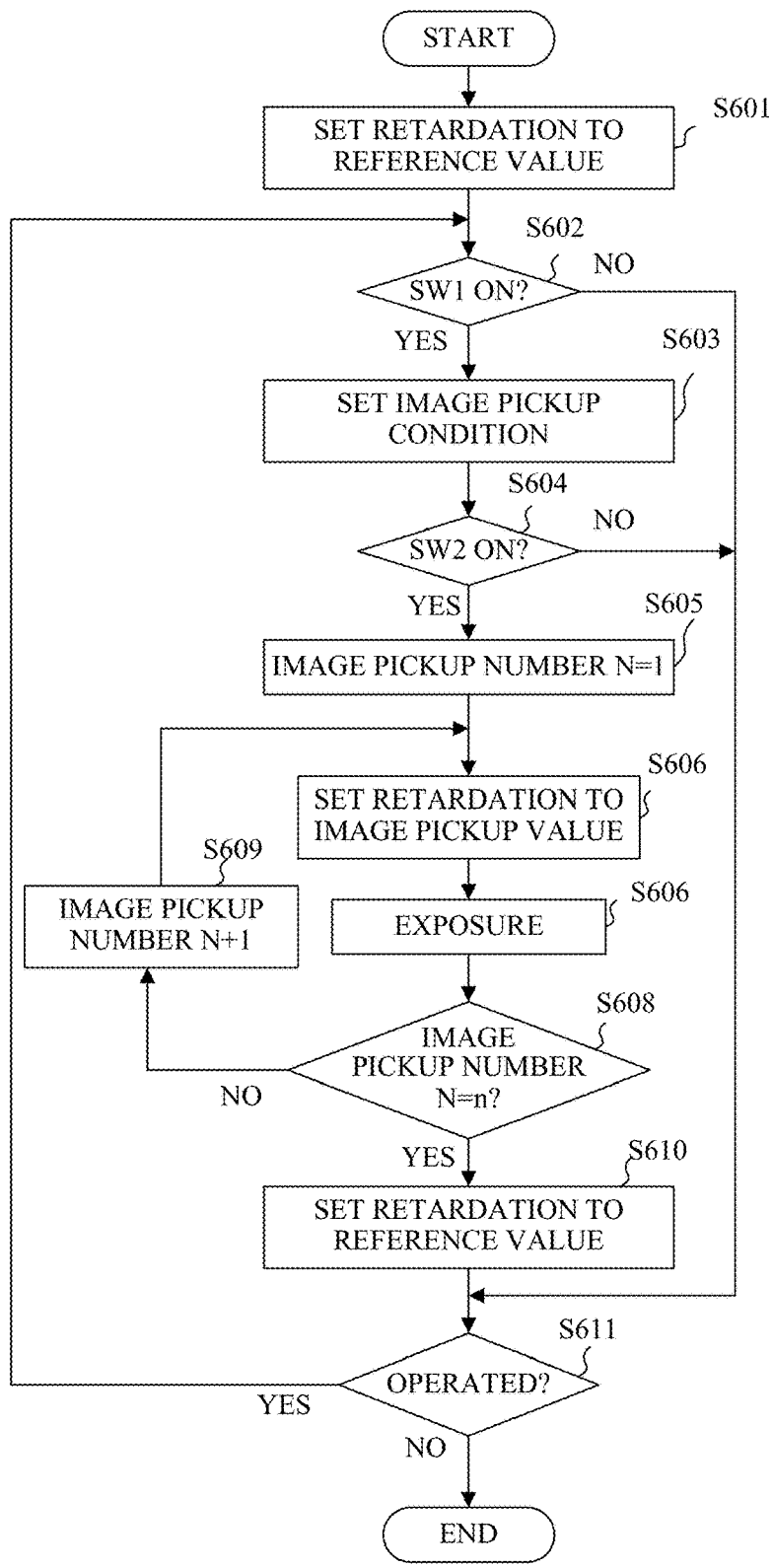
FIG. 14 is a flowchart of the control method according to the second embodiment.

The system controller 11 may count the image pickup number, sequentially set the retardation of the variable retardation 4 to the predetermined image pickup value according to the image pickup number, and control the image pickup apparatus 100 so that the image pickup apparatus 100 can captures images necessary times to acquire the polarization information. FIGS. 13 and 14 are flowcharts of control methods. In each of both control methods, as illustrated in FIGS. 13 and 14, the retardation of the variable retardation plate 4 is set to the reference value except during the exposure period. In FIG. 14, the exposure period starts when the switch 14 is pressed and ends when images are captured necessary times to acquire the polarization information. When the system controller 11 controls the operation of the image pickup apparatus 100 using these control methods, the images can be more quickly captured necessary times to acquire the polarization information.

Third Embodiment

This embodiment describes an image pickup apparatus 500 that can handle the negative influence caused when an optical low-pass filter etc. is arranged. A description of a configuration common to that of the first embodiment will be omitted.

In general, an optical low-pass filter is disposed near the image pickup element so as to prevent the moiré and false color in an image pickup apparatus, such as a digital single-lens reflex camera. The polarization information of the object may not be correctly acquired even with the configuration of the first embodiment, if the optical low-pass filter is disposed in front of the image pickup element 2 or the autofocus unit depends on the polarization. In addition, when the polarization obtainer 7 is simply disposed between the optical low-pass filter and the lens, the optical low-pass filter may not maintain the intended effect due to the influence of the polarization obtainer 7.

Figure 15:
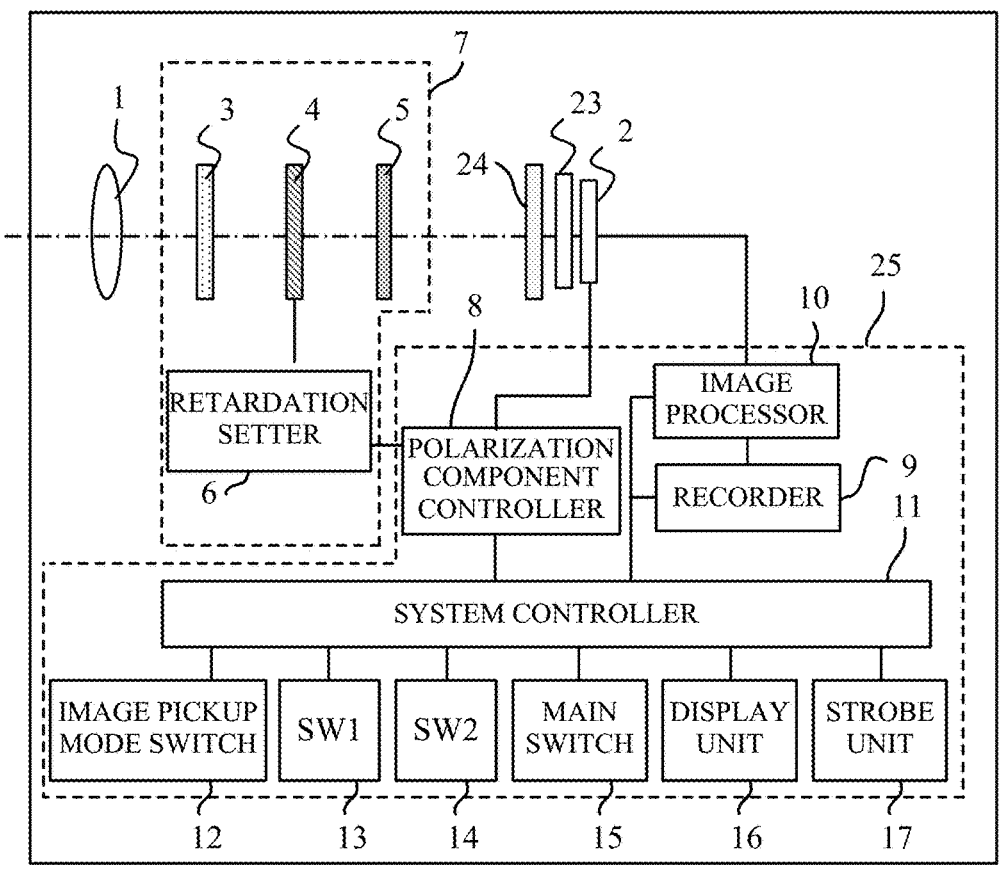
FIG. 15 is a configuration diagram of an image pickup apparatus according to a third embodiment.

FIG. 15 is a schematic diagram of the image pickup apparatus 500 including an optical low-pass filter 24. The optical low-pass filter 24 can use a component using a polarization characteristic, such as a component in which a plurality of layers made of a birefringent medium are laminated and a polarization diffraction element.

As a solution for the above problem that occurs when the optical low-pass filter etc. is disposed, this embodiment inserts an achromatic quarter waveplate 23 (achromatic retardation plate, third retardation plate) into a space between the polarizer 5 and the optical low-pass filter 24 so as to convert the light into circularly polarized light. Although a usual quarter waveplate may be inserted, the quarter waveplate has a wavelength dispersion and does not provide uniformly circularly polarized light over the working wavelength range. Thus, a phase shift caused by the wavelength may appear as a color change in the image. Accordingly, a quarter wavelength plate to be inserted may be an achromatic quarter wavelength plate in which a retardation is designed to be minimum in the working wavelength range, such as a visible wavelength range. An alternative measure is to arrange a light separation direction of a layer in the optical low-pass filter 24 closest to the polarization obtainer 7 (in case of the lamination structure) and a transmitting axis direction of the polarizer 5 at 45 degrees. Even in this case, the characteristic of the optical low-pass filter and the characteristic of the polarization obtainer 7 can be reconciled. The latter measure is simpler although any one of the countermeasures can be used.

Since the working wavelength range for the general image pickup apparatus is the visible range (400 to 700 nm), $\Delta$ in the retardation of the variable retardation plate 4 may be a wavelength contained in the visible range, such as the central wavelength of 550 nm. When the working wavelength range for the image pickup apparatus is the infrared range (700 nm to 1100 nm), $\Delta$ may be a wavelength in the infrared range, such as a wavelength of 900 nm. When the working wavelength range for the image pickup apparatus contains both wavelength ranges, $\Delta$ may be a wavelength in the visible or infrared range, such as a wavelength of 750 nm.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079612, filed Apr. 12, 2016, which is hereby incorporated by reference herein in its entirety.

What is claimed is:

1. An image pickup apparatus configured to obtain polarization information based on a plurality of images captured by changing a retardation provided to light from an object, the image pickup apparatus comprising:
an image pickup element configured to obtain the plurality of images;
a variable retardation plate configured to change the retardation;
a polarizer configured to extract a polarization component guided to the image pickup element; and
a controller configured to control the variable retardation plate so as to vary a transmitted light quantity obtained according to a polarization state of light incident from the object and to set an image pickup condition of the image pickup apparatus,
wherein the controller sets the image pickup condition while the retardation is changed to a reference value that is from −90 degrees to +90 degrees inclusive.

2. The image pickup apparatus according to claim 1, wherein the image pickup condition is at least one of a setting condition relating to an exposure, a setting condition relating to a white balance, a setting condition relating to a light emitter, and a setting condition relating to a focus.

3. The image pickup apparatus according to claim 1, wherein the controller controls the variable retardation plate to change the retardation to the reference value while the image pickup condition is set.

4. The image pickup apparatus according to claim 1, wherein the controller controls the variable retardation plate to change the retardation to the reference value while the image pickup element does not capture an image.

5. The image pickup apparatus according to claim 1, wherein the controller controls the variable retardation plate to change the retardation to an image pickup value for each image capture when image pickup element captures an image.

6. The image pickup apparatus according to claim 5, wherein the controller controls the variable retardation plate to change the retardation to three or more image pickup values.

7. The image pickup apparatus according to claim 6, wherein one of the three or more image pickup values is equal to the reference value.

8. The image pickup apparatus according to claim 7, wherein the image pickup value equal to the reference value is a minimum value in the three or more image pickup values.

9. The image pickup apparatus according to claim 6, wherein the three or more image pickup values contain at least one of a maximum value and a minimum value in a range in which the retardation is variable.

10. The image pickup apparatus according to claim 1, wherein the reference value is a value from −45 degrees to +45 degrees inclusive.

11. The image pickup apparatus according to claim 1, wherein the reference value is a minimum value in a range in which the retardation is variable.

12. The image pickup apparatus according to claim 1, further comprising an optical unit that includes the variable retardation plate configured to change the retardation based on a control signal from the controller.

13. The image pickup apparatus according to claim 12, wherein the variable retardation plate includes a liquid crystal layer configured to change the retardation according to a voltage based on the control signal from the controller.

14. The image pickup apparatus according to claim 13, wherein the retardation has a minimum value in a range in which the retardation is variable, when no voltage is applied to the variable retardation plate.

15. The image pickup apparatus according to claim 12, wherein the optical unit includes a retardation plate configured to provide a relative retardation of $\pi/2$ (rad) between a polarization component in a slow axis direction and a polarization component in a fast axis direction, and the polarizer configured to extract the polarization component guided to the image pickup element;
wherein the retardation plate, the variable retardation plate, and the polarizer are arranged in this order from an object side to an image pickup element side,
wherein the slow axis direction or the fast axis direction of the retardation plate is approximately parallel to the polarization direction extracted by the polarizer; and
wherein the slow axis direction or the fast axis direction of the variable retardation plate inclines by about 45 degrees relative to the polarization direction extracted by the polarizer.

16. A control apparatus configured to change a retardation provided to light from an object to vary a transmitted light quantity obtained according to a polarization state of light incident from the object, and to make an image pickup apparatus capture an image of the object with each retardation,
wherein the control apparatus comprises a setter configured to set an image pickup condition of the image pickup apparatus while a variable retardation plate changes the retardation to a reference value that is from −90 degrees to +90 degrees inclusive and a polarizer extracts a polarization component guided to an image pickup element of the image pickup apparatus to capture the image of the object.

17. A control method configured to control an operation of an image pickup apparatus configured to obtain polarization information based on a plurality of images captured by changing a retardation provided to light from an object, the control method comprising the steps of:
controlling a variable retardation plate to change the retardation to a reference value that is from −90 degrees to +90 degrees inclusive so as to vary a transmitted light quantity obtained according to a polarization state of light incident from the object;
setting an image pickup condition of the image pickup apparatus using the reference value;
controlling a polarizer to extract a polarization component guided to an image pickup element of the image pickup apparatus to capture the image of the object; and
making the image pickup apparatus capture an image of the object based on the image pickup condition.

18. A non-transitory computer-readable storage medium configured to store a computer program that enables a computer to execute the control method according to claim 17.

19. An image pickup apparatus configured to obtain polarization information based on a plurality of images having different polarization states obtained by changing a retardation provided to light from an object, the image pickup apparatus comprising:
an image pickup element configured to obtain the plurality of images;
a controller configured to control a variable retardation plate so as to change the retardation and to set an image pickup condition of the image pickup apparatus; and
an optical unit that includes the variable retardation plate configured to change the retardation based on a control signal from the controller,
wherein the controller sets the image pickup condition while the retardation is changed to a reference value that is from −90 degrees to +90 degrees inclusive,
wherein the optical unit includes a retardation plate configured to provide a relative retardation of $\pi/2$ (rad) between a polarization component in a slow axis direction and a polarization component in a fast axis direction, and a polarizer configured to extract a polarization component guided to the image pickup element,
wherein the retardation plate, the variable retardation plate, and the polarizer are arranged in this order from an object side to an image pickup element side,
wherein the slow axis direction or the fast axis direction of the retardation plate is approximately parallel to the polarization direction extracted by the polarizer, and
wherein the slow axis direction or the fast axis direction of the variable retardation plate inclines by about 45 degrees relative to the polarization direction extracted by the polarizer.

* * * * *